United States Patent [19]

Zimmer et al.

[11] Patent Number: 5,767,201
[45] Date of Patent: Jun. 16, 1998

[54] EMULSION GRAFT POLYMER

[75] Inventors: Guenter Zimmer, Mainz; Josef Poegel, Wiesbaden; Kristin Tiefensee, Westheim, all of Germany

[73] Assignee: BASF Aktiengesellschaft, Ludwigshafen, Germany

[21] Appl. No.: 849,893

[22] PCT Filed: Dec. 20, 1995

[86] PCT No.: PCT/EP95/05056

§ 371 Date: Jun. 16, 1997

§ 102(e) Date: Jun. 16, 1997

[87] PCT Pub. No.: WO96/19509

PCT Pub. Date: Jun. 27, 1996

[30] Foreign Application Priority Data

Dec. 21, 1994 [DE] Germany .................. 44 45 703.0
Jun. 28, 1995 [DE] Germany .................. 195 23 465.0
Jul. 15, 1995 [DE] Germany .................. 195 25 882.7

[51] Int. Cl.$^6$ ............................................. C08L 51/00
[52] U.S. Cl. ...................... 525/309; 525/307; 525/80; 525/85
[58] Field of Search ........................ 525/307, 309, 525/80, 85

[56] References Cited

U.S. PATENT DOCUMENTS

| | | | |
|---|---|---|---|
| 3,793,402 | 2/1974 | Owens | 525/81 |
| 3,808,180 | 4/1974 | Owens | 525/291 |
| 4,180,529 | 12/1979 | Hofmann | 525/85 |
| 5,286,801 | 2/1994 | Besecke et al. | 525/307 |

FOREIGN PATENT DOCUMENTS 512 333  11/1992  European Pat. Off. .
573 893  12/1993  European Pat. Off. .

*Primary Examiner*—Mark L. Warzel
*Attorney, Agent, or Firm*—Keil & Weinkauf

[57] ABSTRACT

Emulsion graft copolymers are composed of

A) from 5 to 18% by weight of a first stage comprising
  $a_1$) from 85 to 99% by weight of methyl methacrylate,
  $a_2$) from 1 to 15% by weight of $C_1$–$C_8$-alkyl acrylate,
  $a_3$) from 0 to 2% by weight of allyl methacrylate and
  $a_4$) from 0 to 3% by weight of further di- or polyfunctional comonomers, B) from 25 to 35% by weight of a second stage comprising
  $b_1$) from 10 to 25% by weight of vinylaromatic monomers,
  $b_2$) from 75 to 90% by weight of $C_1$–$C_{20}$-alkyl acrylate and
  $b_3$) from 0 to 3% by weight of allyl methacrylate, C) from 30 to 40% by weight of a third stage comprising
  $c_1$) from 15 to 27% by weight of vinylaromatic monomers,
  $c_2$) from 73 to 85% by weight of $C_1$–$C_{20}$-alkyl acrylate and
  $c_3$) from 0 to 3% by weight of allyl methacrylate and D) from 15 to 30% by weight of a fourth stage comprising
  $d_1$) from 85 to 96% by weight of methyl methacrylate,
  $d_2$) from 3.8 to 10% by weight of $C_1$–$C_8$-alkyl acrylate,
  $d_3$) from 0 to 2% by weight of further di- or polyfunctional comonomers and
  $d_4$) from 0.2 to 3% by weight of a regulator, with the proviso that the ratio of the amounts of vinylaromatic monomers $c_1$:$b_1$ is from 1.3:1 to 1.9:1 and the sum of the components A to D is 100% by weight.

7 Claims, No Drawings

EMULSION GRAFT POLYMER

The present invention relates to emulsion graft copolymers which are composed of A) from 5 to 18% by weight of a first stage comprising
  $a_1$) from 85 to 99% by weight of methyl methacrylate,
  $a_2$) from 1 to 15% by weight of $C_1$–$C_8$-alkyl acrylate,
  $a_3$) from 0 to 2% by weight of allyl methacrylate and
  $a_4$) from 0 to 3% by weight of further di- or polyfunctional comonomers, B) from 25 to 35% by weight of a second stage comprising
  $b_1$) from 10 to 25% by weight of vinylaromatic monomers,
  $b_2$) from 75 to 90% by weight of $C_1$–$C_{20}$-alkyl acrylate and
  $b_3$) from 0 to 3% by weight of allyl methacrylate, C) from 30 to 40% by weight of a third stage comprising
  $c_1$) from 15 to 27% by weight of vinylaromatic monomers,
  $c_2$) from 73 to 85% by weight of $C_1$–$C_{20}$-alkyl acrylate and
  $c_3$) from 0 to 3% by weight of allyl methacrylate and D) from 15 to 30% by weight of a fourth stage comprising
  $d_1$) from 85 to 96% by weight of methyl methacrylate,
  $d_2$) from 3.8 to 10% by weight of $C_1$–$C_8$-alkyl acrylate,
  $d_3$) from 0 to 2% by weight of further di- or polyfunctional comonomers and
  $d_4$) from 0.2 to 3% by weight of a regulator, with the proviso that the ratio of the amounts of vinylaromatic monomers $c_1$:$b_1$ is from 1.3:1 to 1.9:1 and the sum of the components A to D is 100% by weight.

The present invention furthermore relates to a process for the preparation of these emulsion graft copolymers and to the use thereof.

Emulsion graft copolymers based on vinyl monomers are generally known and are used by themselves but in particular as additives in plastics, such as acrylate- and methacrylate-based homo- or copolymers. Their addition results in an improvement in the impact strength of such acrylate resins, which can be processed, for example, to moldings, sheets, films and organic glass (acrylic glass). The other important basic properties of acrylate resins, such as high light transmittance and clarity, weather resistance, heat distortion resistance and mechanical strength, may however be adversely affected by these additives. It is therefore generally desirable to keep the undesirable property changes as small as possible or—if possible—to prevent them and at the same time to achieve an increase in the impact strength by means of emulsion graft copolymers having a multistage structure and special composition.

DE-A 22 53 689 discloses multistage emulsion graft copolymers. The polymers described in detail there are composed of three stages, ie. a core and a first and a second graft shell, the core and second shell consisting of a hard, nonelastomeric polymer and the first shell of an elastomeric polymer. Furthermore, this publication points out the possibility of a multistage structure of the graft polymers comprising alternating hard and elastomeric phases.

Moreover, EP-A-512 333 describes emulsion graft copolymers which are composed of a hard core and four graft shells, hard and soft stages alternating.

If the known emulsion graft copolymers are used as additives in thermoplastics, in particular acrylate resins, such as polymethyl methacrylate, their impact strength increases but edges of moldings or coatings on moldings have a yellowish tinge, which is undesirable. In addition, the known emulsion graft copolymers cannot be sufficiently thoroughly dispersed in the thermoplastics so that the haze will be satisfactorily low for many applications.

A further problem is the formation of shell-like indentations in extruded sheets, in particular of polymethyl methacrylate toughened with the known emulsion graft copolymers. The formation of shell-like indentations is understood as meaning shell-like indentations which form at the edges when the sheets are sawn for processing. In addition, injection molded parts splinter or crack when sprues are mechanically removed.

It is an object of the present invention to provide emulsion graft copolymers as impact strength improvers for thermoplastic materials, which impart high impact strength to these materials and at the same time improve the mechanical and optical properties, such as yellow tinge of edges and haze, and reduce the tendency to form shell-like indentations.

We have found that this object is achieved by the emulsion graft copolymers defined at the outset. Preferred embodiments are evident from the description.

We have also found a process for their preparation, their use as additives in thermoplastic materials and moldings, films and coatings comprising these thermoplastic materials.

The novel emulsion graft copolymers have a four-stage composition comprising a hard, nonelastomeric stage (A), an elastomeric, second stage (B), an elastomeric, third stage (C) and finally an outer, hard, nonelastomeric, fourth stage (D), the individual stages being present in the following amounts:

from 5 to 18, preferably from 10 to 16, % by weight of a first stage (A), from 25 to 35, preferably from 28 to 33, % by weight of a second stage (B), from 30 to 40, preferably from 32 to 36, % by weight of a third stage (C) and from 15 to 30, preferably from 18 to 26, % by weight of a fourth stage (D), with the proviso that the stages A to D give 100% by weight.

The first stage A of the emulsion graft copolymer consists of from 85 to 99, preferably from 90 to 98, % by weight of methyl methacrylate ($a_1$), from 1 to 15, preferably from 3 to 10, % by weight of $C_1$–$C_8$-alkyl acrylate ($a_2$), from 0 to 2, preferably from 0.2 to 1.2, % by weight of allyl methacrylate ($a_3$) and from 0 to 3, preferably from 0.1 to 0.5, % by weight of further di- or polyfunctional comonomers ($a_4$).

The sum of the components $a_1$ to $a_4$ is 100% by weight.

Suitable $C_1$–$C_8$-alkyl acrylates $a_2$ are both linear and branched alkyl esters of acrylic acid. The preferred $C_1$–$C_8$-alkyl acrylates include methyl acrylate, ethyl acrylate, n-propyl acrylate, isopropyl acrylate, n-butyl acrylate, isobutyl acrylate and tert-butyl acrylate. Among these, methyl acrylate and ethyl acrylate are particularly preferred. Mixtures of different $C_1$–$C_8$-alkyl acrylates may also be used.

Examples of di- or polyfunctional comonomers ($a_4$) are alkylene glycol diacrylates, such as ethylene glycol diacrylate, propylene glycol diacrylate, 1,3-butylene glycol diacrylate and 1,4-butylene glycol diacrylate, alkylene glycol dimethacrylates, such as ethylene glycol dimethacrylate, propylene glycol dimethacrylate, 1,3-butylene glycol dimethacrylate and 1,4-butylene glycol dimethacrylate, acrylates and methacrylates of glycerol, trimethylolpropane, pentaerythritol, inositol and similar sugar alcohols, acrylamides and methacrylamides of ethylenediamine and other aliphatic di- and polyamines, triacrylamides and trimethacrylamides, triallyl cyanurate and triallyl isocyanurate and vinylbenzenes, such as divinylbenzene and trivinyl benzene.

Mixtures of different comonomers $a_4$ may also be used.

The comonomers ($a_4$) serve as crosslinking agents. Owing to their ability to be uniformly incorporated in the polymeric phase, they are also referred to as polymerization crosslinking agents. During the polymerization reaction, the rate at which they are consumed is essentially comparable to that of the main monomer, resulting in crosslinking within the phase.

The comonomers ($a_4$) may be present in an amount of up to 3% by weight in the first stage but are preferably not present or present only in amounts of from 0.1 to 0.5% by weight.

Allyl methacrylate ($a_3$) is present as a graft-linking comonomer in an amount of from 0 to 2% by weight in the first stage, the amount depending on the desired size of the first stage. In the case of a preferred size of from 50 to 200 nm, the amount of allyl methacrylate is from 0.2 to 1.5% by weight.

Graft-linking comonomers ensure external crosslinking and effect, for example, the linking of the first stage (core phase) to the subsequent polymerization stage (graft shell) in the synthesis of an emulsion graft copolymer. Graft-linking agents, such as allyl methacrylate, exhibit this behavior because a polymerizable double bond (double bond of the acid moiety) polymerizes at a rate comparable to that of the main monomer (methyl methacrylate). On the other hand, the double bond of the allyl group reacts at a substantially lower polymerization rate so that some of these double bonds are retained unchanged in the core phase at the end of the polymerization, permitting graft-linking between two phases.

The first stage A has in general a glass transition temperature of more than 50° C., preferably from 80° to 130° C.

In a second stage B, a monomer mixture comprising from 10 to 25, preferably from 10 to 20, % by weight of a vinylaromatic monomer ($b_1$), from 75 to 90, preferably from 78 to 88, % by weight of a $C_1$–$C_{20}$-alkyl acrylate ($b_2$) and from 0 to 3, preferably from 0.5 to 2, % by weight of allyl methacrylate ($b_3$)

is polymerized in the presence of the emulsion polymer of the first stage, which is also referred to as a core latex or seed latex. The sum of the components $b_1$ to $b_3$ is 100% by weight.

Suitable vinylaromatic monomers ($b_1$) are styrene, α-methylstyrene, tert-butylstyrene, monochlorostyrene, vinyltoluene and phenyl acrylate and methacrylate.

The vinylaromatic monomers ($b_1$), in particular styrene, are particularly important since they increase the refractive index. In this way, it can be matched with the refractive indices of the first stage and of the subsequent stages. Moreover, the refractive index can also be matched to that of the thermoplatic material by means of the vinylaromatic monomers of the emulsion graft copolymer.

Among the $C_1$–$C_{20}$-alkyl acrylates ($b_2$), the $C_2$–$C_{10}$-alkyl esters are preferred. Both straight-chain and branched alkyl esters of acrylic acid may be used. n-Butyl acrylate and 2-ethylhexyl acrylate are particularly preferred. Mixtures of different acrylates ($b_2$) may also be used.

Furthermore, from 0 to 3, preferably from 0.5 to 2, % by weight of the graft-linking agent allyl methacrylate ($b_3$) are present in the monomer mixture of the second stage.

The glass transition temperature of stage B is in general less than 0° C., preferably from −10° to −40° C.

The third stage is elastomeric like the second stage and consists of from 15 to 27, preferably from 17 to 25, % by weight of vinylaromatic monomers $c_1$, from 73 to 85, preferably from 73 to 80, % by weight of $C_1$–$C_{20}$-alkyl acrylate $c_2$ and from 0 to 3, preferably from 0.5 to 2, % by weight of allyl methacrylate $c_3$.

The sum of the components $c_1$ to $c_3$ is 100% by weight.

The monomers used include those stated for the second stage. The monomers of the third stage need not be identical to those of the second stage. Preferably, however, the same monomers as in the second stage are used. However, the third stage differs from the second stage in the quantitative composition of the monomer mixture. According to the invention, the amount of vinylaromatic monomers $c_1$ is from 1.3 to 1.9 times the amount of vinylaromatic monomers $b_1$.

The glass transition temperature of stage C is as a rule less than 0° C., preferably from −10° to −40° C.

In the fourth stage D, a monomer mixture is polymerized to an outer hard fourth stage D in the presence of the already formed latex comprising the stages A to C. The amount of this stage—also referred to as the outer hard phase—is from 15 to 30, preferably from 18 to 26, % by weight, based on the total amount of the emulsion graft copolymer, and consists of from 85 to 96, preferably from 90 to 96, % by weight of methyl methacrylate $d_1$, from 3.8 to 10, preferably from 4 to 8, % by weight of $C_1$–$C_8$-alkyl acrylate $d_2$, from 0 to 2, preferably from 0 to 1, % by weight of di- or polyfunctional comonomers $d_3$ and from 0.2 to 3, preferably from 0.5 to 3, % by weight of a regulator $d_4$, where $d_2$ and $d_3$ are to be understood as meaning the same monomers as stated for the first stage. The monomers $d_2$ and $d_3$ may differ from $a_2$ and $a_4$. Preferably, however, the same monomers are used. The sum of the components $d_1$ to $d_4$ is 100% by weight.

Suitable regulators ($d_4$) are monofunctional alkyl mercaptans, such as sec-butyl mercaptan, n-dodecyl mercaptan and tert-dodecyl mercaptan. n-Dodecyl mercaptan is particularly suitable.

The presence of a regulator is particularly important since it limits the chain length in the polymerization of the end phase. In this way, the molecular weight of the outer hard phase D can be adapted to that of the thermoplastic material, which is advantageous particularly when blending the emulsion graft copolymers with thermoplastic materials.

The glass transition temperature of the fourth stage D is greater than 50° C., preferably from 80° to 130° C.

The novel emulsion graft copolymers can be prepared in a manner known per se by the emulsion graft polymerization method, which is also referred to as the seed latex method, the latex particles remaining in the emulsified state up to the end of the final stage.

The total content of particles in the four-stage end product is determined by the polymeric product in the seed latex. This means that, after the first polymerization stage, essentially no new particles are formed and the particle content remains roughly constant.

By using emulsifiers, it is possible to establish the particle size of both the first stage and the latex particles in the subsequent stages, the type and concentration of emulsifier being critical.

Ionic and nonionic emulsifiers may be used.

Suitable emulsifiers are, for example, sodium dioctylsulfosuccinate, sodium laurylsulfate, sodium dodecylbenzenesulfonate, alkylphenoxypolyethylenesulfonates and salts of long-chain carboxylic and sulfonic acids.

Examples of suitable nonionic emulsifiers are fatty alcohol polyglycol ethers, alkylaryl polyglycol ethers, fatty acid monoethanolamides and ethoxylated fatty amides and fatty amines.

The total amount of emulsifier is preferably from 0.05 to 5% by weight, based on the total weight of the emulsion graft copolymer.

The diameter of the final emulsion polymer particles is brought in a manner known per se to 100–400 nm, for example 250–400 nm, preferably 300–350 nm. In a further preferred embodiment, said diameter is from 150 to 300 nm.

Ammonium and alkali metal peroxodisulfates, such as potassium peroxodisulfate, and initiator combination systems, such as sodium persulfate, sodium hydrosulfite, potassium persulfate, sodium formaldehyde sulfoxylate and potassium peroxodisulfate and sodium dithionite/iron(II) sulfate, may be used as polymerization initiators, and the polymerization temperature may be from 50° to 100° C. in the case of the ammonium and alkali metal peroxodisulfates to be thermally activated and may be lower, for example from 20° to 50° C., in the case of the initiator combinations which are effective redox systems.

The total amount of initiator is preferably from 0.02 to 0.5% by weight, based on the prepared emulsion polymer.

In addition to the molecular weight regulator, which is used in the polymerization of the outer hard stage (D), the polymerization of the first and other stages can also be carried out in the presence of a regulator. The total amount of regulator is in general from 0.01 to 1% by weight, based on the total weight of the polymer.

In general, it is advisable to keep the pH constant, and the presence of a buffer is therefore advantageous. Salts of phosphoric acid, for example mixtures of potassium dihydrogen phosphate and disodium hydrogen phosphate, are usual; ammoniacal solutions may also be used.

According to the novel process, the component C is always in excess relative to the component B, ie. the amount of monomer mixture C is always greater than that of monomer mixture B. According to the novel process, it is also necessary to ensure that the ratio of the amounts of vinylaromatic monomers $c_1$ to $b_1$ is from 1.3:1 to 2.0:1, in particular 1.4:1 to 1.9:1. This is preferably done by first polymerizing the elastomeric stage B onto the core A by feeding in the corresponding monomer mixture B and then polymerizing a further elastomeric shell C onto the elastomeric shell B by feeding in the monomer mixture C.

The polymerization can be carried out at from 70° to 100° C., a temperature of from 85° to 95° C. being preferred. The polymerization times increase at below 70° C. and the polymerization has to be carried out under pressure at above 100° C.

In other respects, the novel emulsion graft copolymer is prepared by initially taking an aqueous mixture consisting of monomers, crosslinking agent, emulsifier, initiator, regulator and a buffer system in a reactor blanketed with nitrogen, establishing an inert atmosphere at room temperature while stirring and then bringing the mixture to the polymerization temperature for from about 15 to 120 minutes. In this way, the core latex A is first formed by emulsification and polymerization of the core monomer mixture.

If necessary after a subsequent reaction time of from 15 to 120 minutes, stages C and D are produced by emulsion polymerization with feeding of the monomers in the presence of the already formed stage A. Then, possibly also after a subsequent reaction time, the outer hard phase D is formed by emulsion polymerization of the corresponding monomers. It may be advantageous in each case to emulsify the monomers before the feed while stirring in the aqueous medium.

The emulsion graft copolymer is isolated from the resulting latex in a known manner by precipitation, filtration and subsequent drying. For example, aqueous solutions of inorganic salts, such as sodium chloride, sodium sulfate, magnesium sulfate and calcium chloride, aqueous solutions of salts of formic acid, such as magnesium formate, calcium formate and zinc formate, aqueous solutions of inorganic acids, such as sulfuric and phosphoric acid, and aqueous ammoniacal and amine solutions and other aqueous alkaline solutions, for example of sodium hydroxide and potassium hydroxide, can be used for the precipitation.

The drying can be carried out, for example, by freeze drying, spray drying, fluidized-bed drying and drying in a through-circulation oven.

The dried emulsion graft copolymer can then be processed in extruders with acrylate resins to give impact-resistant thermoplastic materials.

Furthermore, coagulation and dewatering of the latex can be carried out directly in the extruder. For the preparation of the thermoplastic materials, the latex may also be mixed with the base resin directly in the extruder.

The novel emulsion graft copolymers can be processed, either alone or with blending with acrylate resins, in particular polymethyl methacrylate, to give impact-resistant moldings, such as sheets, films and coatings, not only by extrusion but also by other processing methods, such as calendering and injection molding. Moreover, other additives, such as antioxidants, light stabilizers, heat stabilizers, lubricants, dyes and fillers may also be incorporated.

The novel emulsion graft copolymers are preferably used as additives for improving the impact resistance of thermoplastic materials based on acrylate resins. Such acrylate resins are essentially composed of methyl methacrylate and up to 50% by weight of further comonomers. In the main, these are monofunctional monomers, such as $C_1$–$C_8$-alkyl acrylates and $C_2$–$C_8$-alkyl methacrylates. Polymers which contain from 80 to 99% by weight of methyl methacrylate, from 1 to 20% by weight of $C_1$–$C_8$-alkyl acrylate, preferably methyl acrylate or ethyl acrylate, and from 0 to 15% by weight of further comonomers are particularly preferred.

Preferred thermoplastic materials contain

I) from 10 to 60% by weight of emulsion graft copolymers as claimed in claim 1 and II) from 40 to 90% by weight of a polymer containing II$_1$) from 80 to 99% by weight of methyl methacrylate, II$_2$) from 1 to 20% by weight of $C_1$–$C_8$-alkyl acrylate and II$_3$) from 0 to 15% by weight of further comonomers and III) from 0 to 20% by weight of additives or processing assistants or of mixtures thereof.

Thermoplastic materials which contain from 30 to 45% by weight of emulsion graft copolymers and from 55 to 70% by weight of polymers II are particularly preferred.

In addition to a toughness/rigidity ratio which is improved compared with the prior art, moldings of the novel thermoplastic materials exhibit a substantially smaller tendency to form shell-like indentations on sawing; injection molded parts have a smooth residual surface after removal of the sprues. Compared with shaped articles of known thermoplastic materials, the yellow tinge at the edges of shaped articles of the novel materials is substantially reduced. The same applies to the haze.

Examples

The following abbreviations are used:

| MMA | methyl methacrylate |
| MA | methyl acrylate |
| ALMA | allyl methacrylate |
| BA | butyl acrylate |
| S | styrene |
| n-DCM | n-dodecyl mercaptan |

Preparation of the emulsion graft copolymers

Comparative Example A 96 parts by weight of water, 0.34 part by weight of sodium dioctylsulfosuccinate and 0.05 part by weight of potassium peroxodisulfate were initially taken, together with 19 parts by weight of MMA, 0.85 part by weight of MA and 0.09 part by weight of ALMA, in a pressure-resistant reactor having a volume of 800 l are were polymerized at 90° C. for 30 minutes. A core A was obtained in this manner.

Thereafter, 72 parts by weight of BA, 15.8 parts by weight of styrene and 1.8 parts by weight of ALMA, together with 0.11 part by weight of potassium peroxodisulfate, were added to this emulsion and polymerization was carried out at 90° C. for 1 hour. Stage B formed.

Thereafter, 27 parts by weight of MMA, 1.3 parts by weight of MA, 0.18 part by weight of nDCM and 0.02 part by weight of potassium peroxodisulfate were added and polymerization was carried out at 90° C. for 1 hour until a conversion of 98% had been reached. A further shell C resulted.

Example 1

A core A was prepared similarly to Comparative Example 1.

Thereafter, 72 parts by weight of BA, 15.8 parts by weight of styrene, 1.8 parts by weight of ALMA and 0.11 part by weight of potassium peroxodisulfate were added in the course of 2 hours to the resulting emulsion at 90° C. The monomer mixture was added by a procedure in which first a total of 46% by weight of the total monomer amount of stages B and C was polymerized for 1 hour, this feed containing 35% by weight of the total styrene. Stage B thus formed.

54% by weight of the total monomer amount B and C were then polymerized at 90° C. for 1 hour, the feed now containing 65% by weight of the total styrene. The styrene-richer stage C resulted.

Finally, 27 parts by weight of MMA, 1.3 parts by weight of MA, 0.18 part by weight of nDCM and 0.02 part by weight of potassium peroxodisulfate were also added while polymerization was carried out at 90° C. for 1 hour until a conversion of at least 98% had been reached. It was possible to prepare shell D in this manner.

Example 2

An emulsion graft copolymer having shells A, B, C and D was prepared similarly to novel Example 1, except that the feed of the monomer mixtures B and C was such that first a total of 49% by weight of the total monomer amount of stages B and C was polymerized for 1 hour and this first feed contained 40% by weight of the total styrene. 51% by weight of the total monomer amount of stages B and C were then polymerized, this second feed now containing 60% by weight of the total styrene.

Comparative Example B

An emulsion graft copolymer having shells A, B, C and D was prepared similarly to novel Example 2, except that the feed of the monomer mixtures B and C was changed so that the first feed contained 47% by weight of the total monomer amount B and C and 32% by weight of the total styrene. Accordingly, the second feed contained 53% by weight of the total monomer amount B and C and 68% by weight of the total styrene.

Comparative Example C

An emulsion graft copolymer having shells A, B, C and D was prepared similarly to novel Example 2, except that the feed of the monomer mixtures B and C was changed so that the first feed contained 50% by weight of the total monomer amount B and C and 45% by weight of the total styrene. Accordingly, the second feed contained likewise 50% by weight of the total monomer amount B and C and 55% by weight of the total styrene.

Testing of performance characteristics

The following properties were determined:

impact strength $a_N$ according to DIN 53 453 light transmittance $\tau$ according to DIN 5036 (6 mm)

haze according to DIN 5036 (6 mm)

yellowness index YI according to ASTM-D 1925 modulus of elasticity according to DIN 53457-3 formation of shell-like indentations splintering.

The impact strength $a_N$ was tested by the Charpy method. In this test method, a standardized test specimen resting on two supports is destroyed or damaged by an impact aimed at its center. The energy (kJ) required for the destruction or damage is based on the critical cross-section (m$^2$) and defined as impact strength $a_N$ (dimension kJ/m$^2$).

The light transmittance $\tau$ (dimension %) is defined as the ratio of the light transmitted by a sample to the intensity of the incident light. It was determined as a function of the wavelength in a range from 400 to 900 nm using a 6 mm thick test specimen.

Transparent plastics for which optical clarity is essential for use are investigated to determine their haze. The haze (dimension %) is defined as that part of the light transmitted by a material sample whch deviates from the direction of the light ray incident on the sample, owing to scattering which takes place on the material. The haze was determined using a 6 mm thick test specimen.

The yellowness index YI is measured on the basis of color coordinates which are calculated from the transmission spectrum according to DIN 5036. The illuminant D65 and the wide-field standard observer are used as a basis.

The modulus of elasticity was determined by applying a tension to a standardized test specimen at a standardized draw-off speed according to DIN 53457-3. The modulus of elasticity was determined from the slope of the tangent at the origin of the tension-stress curve.

The composition of the emulsion graft copolymers and the results of the individual tests of the performance characteristics are shown in Table 1. The compositions were chosen so that the content of elastomeric stages is the same in all examples. The results of the tests show that the novel emulsion graft copolymers are superior to the prior art emulsion polymers in their mechanical, thermal and optical properties.

TABLE

| Example | VA | | | 1 | | | | 2 | | | |
|---|---|---|---|---|---|---|---|---|---|---|---|
| Stage | $^1H^{1)}$ | $^2S^{1)}$ | $^3S$ | $A_1$ | $B_1$ | $C_1$ | $D_1$ | $A_2$ | $B_2$ | $C_2$ | $D_2$ |
| Component [% by wt.]: | | | | | | | | | | | |
| Stage | 14 | 65 | 21 | 14 | 30 | 35 | 21 | 14 | 31.2 | 33.5 | 21 |
| MMA | 95.3 | | 95.0 | 95.3 | | | 95.0 | 95.3 | | | 95.0 |
| MA | 4.2 | | 4.5 | 4.2 | | | 4.2 | 4.2 | | | 4.5 |
| ALMA | 0.5 | 2.0 | | 0.5 | 1.0 | 1.0 | | 0.5 | 1.0 | 1.0 | |
| BA | | 80.4 | | | 85.1 | 77.2 | | | 84.3 | 78.4 | |
| S | | 17.6 | | | 12.9 | 21.8 | | | 14.7 | 20.6 | |
| nDCM | | | 0.5 | | | | 0.5 | | | | 0.5 |
| Proportion of the second feed (Shell C) [% by wt.] | – | | | | 54 | | | | 51 | | |
| Ratio of the styrene amounts ($C_1:b_1$) | – | | | | 1.86 | | | | 1.5 | | |
| Properties: | | | | | | | | | | | |
| τ | | 90.8 | | | 92.0 | | | | 92.0 | | |
| Haze | | 2.0 | | | 1.8 | | | | 1.7 | | |
| YI | | 1.1 | | | 0.9 | | | | 0.8 | | |
| YI (edge) | | ++ | | | 0 | | | | – | | |
| $a_N$ [kJ/m$^2$] | | 76.2 | | | 86.7 | | | | 89.5 | | |
| Modulus of elasticity [Nm/mm$^2$] | | 1660 | | | 1800 | | | | 1823 | | |
| Formation of shell-like indentations Number of defects/m | | 12 | | | 5 | | | | 3 | | |
| Defect size [mm] | | >1 | | | <0.5 | | | | ≦0.5 | | |
| Tendency to splinter | | ++ | | | – | | | | – | | |

| Example | VB | | | | VC | | | |
|---|---|---|---|---|---|---|---|---|
| Stage | $A_3$ | $B'_3$ | $C'_3$ | $D_3$ | $A_4$ | $B'_4$ | $C'_4$ | $D_4$ |
| Component [% by wt.]: | | | | | | | | |
| Stage | 14 | 30 | 35 | 21 | 14 | 31 | 33 | 21 |
| MMA | 95.3 | | | 95.0 | 95.3 | | | 95.0 |
| MA | 4.2 | | | 4.5 | 4.2 | | | 4.5 |
| ALMA | 0.5 | 1.0 | 1.0 | | 0.5 | 1.0 | 1.0 | |
| BA | | 87.5 | 75.8 | | | 82.7 | 79.B | |
| S | | 11.5 | 23.2 | | | 16.3 | 19.2 | |
| nDCM | | | | 0.5 | | | | 0.5 |
| Proportion of the second feed (Shell C) [% by wt.] | | 53 | | | | 50 | | |
| Ratio of the styrene amounts ($C_1:b_1$) | | 2.1 | | | | 1.2 | | |
| Properties: | | | | | | | | |
| τ | | 91.7 | | | | 91.7 | | |
| Haze | | 2.2 | | | | 2.0 | | |
| YI | | 1.4 | | | | 1.0 | | |
| YI (edge) | | + | | | | + | | |
| $a_N$ [kJ/m$^2$] | | 79.6 | | | | 83.0 | | |
| Modulus of elasticity [Nm/mm$^2$] | | 1760 | | | | 1785 | | |
| Formation of shell-like indentations Number of defects/m | | 10 | | | | 13 | | |
| Defect size [mm] | | ≦0.5 | | | | ≧0.5 | | |
| Tendency to splinter | | 0 | | | | + | | |

[1)] H: hard (nonelastomeric) stage
S: soft (elastomeric) stage
[2)] ++: very substantial, +: substantial, 0: slight, –: not present

We claim:

1. An emulsion graft copolymer composed of
   A) from 5 to 18% by weight of a first stage comprising
      $a_1$) from 85 to 99% by weight of methyl methacrylate,
      $a_2$) from 1 to 15% by weight of $C_1$–$C_8$-alkyl acrylate,
      $a_3$) from 0 to 2% by weight of allyl methacrylate and
      $a_4$) from 0 to 3% by weight of further di- or polyfunctional comonomers,
   B) from 25 to 35% by weight of a second stage comprising
      $b_1$) from 10 to 25% by weight of vinylaromatic monomers,
      $b_2$) from 75 to 90% by weight of $C_1$–$C_{20}$-alkyl acrylate and
      $b_3$) from 0 to 3% by weight of allyl methacrylate,
   C) from 30 to 40% by weight of a third stage comprising
      $c_1$) from 15 to 27% by weight of vinylaromatic monomers,
      $c_2$) from 73 to 85% by weight of $C_1$–$C_{20}$-alkyl acrylate and
      $c_3$) from 0 to 3% by weight of allyl methacrylate and
   D) from 15 to 30% by weight of a fourth stage comprising
      $d_1$) from 85 to 96% by weight of methyl methacrylate,
      $d_2$) from 3.8 to 10% by weight of $C_1$–$C_8$-alkyl acrylate,
      $d_3$) from 0 to 2% by weight of further di- or polyfunctional comonomers and
      $d_4$) from 0.2 to 3% by weight of a regulator,
   with the proviso that the ratio of the amounts of vinylaromatic monomers $c_1$:$b_1$ is from 1.3:1 to 1.9:1 and the sum of the components A to D is 100% by weight.

2. A process for the preparation of an emulsion graft copolymer, wherein
   A) from 5 to 18% by weight of a monomer mixture comprising
      $a_1$) from 85 to 99% by weight of methyl methacrylate,
      $a_2$) from 1 to 15% by weight of $C_1$–$C_8$-alkyl acrylate,
      $a_3$) from 0 to 2% by weight of allyl methacrylate and
      $a_4$) from 0 to 3% by weight of further di- or polyfunctional comonomers,
   B) from 25 to 35% by weight of a monomer mixture comprising
      $b_1$) from 10 to 25% by weight of vinylaromatic monomers,
      $b_2$) from 75 to 90% by weight of $C_1$–$C_{20}$-alkyl acrylate and
      $b_3$) from 0 to 3% by weight of allyl methacrylate,
   C) from 30 to 40% by weight of a monomer mixture comprising
      $c_1$) from 15 to 27% by weight of vinylaromatic monomers,
      $c_2$) from 73 to 85% by weight of $C_1$–$C_{20}$-alkyl acrylate and
      $c_3$) from 0 to 3% by weight of allyl methacrylate and
   D) from 15 to 30% by weight of a monomer mixture comprising
      $d_1$) from 85 to 96% by weight of methyl methacrylate,
      $d_2$) from 3.8 to 10% by weight of $C_1$–$C_8$-alkyl acrylate,
      $d_3$) from 0 to 2% by weight of further di- or polyfunctional comonomers and
      $d_4$) from 0.2 to 3% by weight of a regulator,
   are polymerized in succession, wherein the sum of the components A to D is 100% by weight and the component C is always in excess relative to the component B and the ratio of the amounts of vinylaromatic monomers $c_1$:$b_1$ is from 1.3 to 2.0:1.

3. A process as claimed in claim 2, wherein the ratio of the amounts of vinylaromatic monomers $c_1$ to $b_1$ is from 1.4:1 to 1.9:1.

4. A thermoplastic material containing from 10 to 60% by weight of an emulsion graft copolymer as claimed in claim 1.

5. A thermoplastic material as claimed in claim 4, containing
   I) from 10 to 60% by weight of an emulsion graft copolymer as claimed in claim 1 and
   II) from 40 to 90% by weight of a polymer containing
      $II_1$) from 80 to 99% by weight of methyl methacrylate,
      $II_2$) from 1 to 20% by weight of $C_1$–$C_8$-alkyl acrylate and
      $II_3$) from 0 to 20% by weight of further comonomers and
   III) from 0 to 20% by weight of additives or processing assistants or of mixtures thereof.

6. A molding, film or coating, containing a thermoplatsic material as claimed in claim 4.

7. A thermoplastic material with increased impact resistance containing an emulsion graft copolymer as claimed in claim 1.

* * * * *